(No Model.)
S. GROSSMANN.
FLOUR SIFTER.
No. 467,594. Patented Jan. 26, 1892.
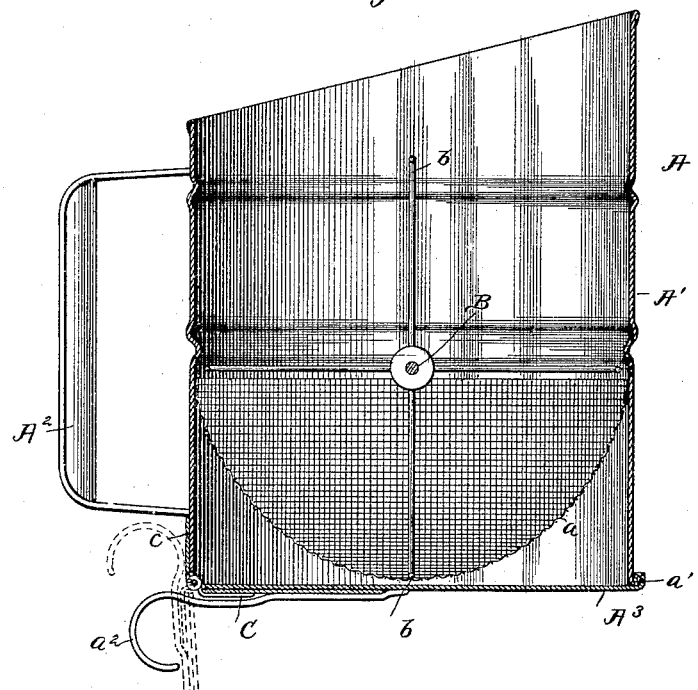
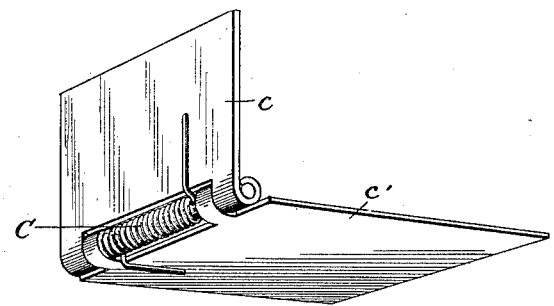
Witnesses.
Wm M. Rheem
Otto Luebkert
Inventor
Salaman Grossmann,
By Lohr Kennedy
Atty's.

UNITED STATES PATENT OFFICE.

SALOMON GROSSMANN, OF CHICAGO, ILLINOIS.

FLOUR-SIFTER.

SPECIFICATION forming part of Letters Patent No. 467,594, dated January 26, 1892.

Application filed February 19, 1891. Serial No. 382,068. (No model.)

*To all whom it may concern:*

Be it known that I, SALOMON GROSSMANN, a citizen of the United States of America, residing at Chicago, in the county of Cook and State of Illinois, have invented certain new and useful Improvements in Flour-Sifters, of which the following is a specification, reference being had therein to the accompanying drawings.

This invention relates to a novel construction in flour-sifters, the object being to provide a convenient, useful, and efficient device of this kind embracing a simple and durable construction.

The invention consists in the details of construction and combinations of parts hereinafter fully described and claimed.

In the accompanying drawings, illustrating my invention, Figure 1 is a central vertical section of a flour-sifter constructed in accordance with my invention, and Fig. 2 is a detail perspective view.

Referring to Fig. 1 of the drawings, A indicates as a whole a flour-sifter comprising the cylindric casing A', within the lower end portion of which is secured a semi-globular sifter $a$.

B is a shaft passing through the casing and provided outside the casing with a handle, (not shown,) by means of which it can be turned. The said shaft is provided with semicircular wire arms $b\,b$, that pass over the semi-globular sifter $a$.

$A^2$ is the handle by which the sifter is held.

In accordance with my invention I provide the casing A' with a bottom $A^3$, which can be removed at any time it is desired to sift flour and closed at all other times. In this way the objectionable dropping of the flour through the sifter, when it is not desired, is avoided. The sifter can be filled with flour and then carried around or be placed upon anything without liability of dropping flour thereon; but when it is desired to sift the flour, by removing said bottom the device is ready.

The particular construction comprises a circular bottom $A^3$, hinged at one side to the casing and having an upturned flange $a'$, which embraces the lower edge of the casing A', to make a tight joint. The said bottom $A^3$ is provided with a handle or finger-piece $a^2$, located adjacent its hinge-joint, by means of which it can be opened and closed. The said bottom is hinged to the casing adjacent its handle $A^2$, so that the operator can open and close the bottom with the same hand that holds the sifter and leaving the other hand free to operate the arms.

In Fig. 1 the bottom is shown in a closed position in full lines and open in dotted lines.

As a further and separate improvement, the bottom is provided with a spring C, which serves to close it and hold it closed.

In Fig. 2 is shown the particular construction of hinge-joint employed, comprising a plate $c$, to be attached to casing, and a plate $c'$, to be attached to bottom $A^3$. These plates $c$ and $c'$ are hinged to each other, and the spring C is placed upon the pivot of the hinge and bears at its opposite ends against said plates. It will be obvious, however, that hinge-joints differing in construction can be employed without departing from my invention.

I claim as my invention—

1. A flour-sifter having a handle $A^2$ and a removable bottom pivotally secured to the casing adjacent to said handle, said bottom being provided with a handle adjacent to its connection with the casing.

2. A flour-sifter having a handle $A^2$ and a bottom hinged to its casing adjacent to said handle $A^2$, said bottom being provided with a handle adjacent to its hinge connection with said casing.

3. A flour-sifter having a handle $A^2$, a bottom hinged to its casing adjacent to said handle $A^2$, a spring for closing said bottom, and a handle upon said bottom adjacent to its connection with said spring.

In testimony whereof I affix my signature in presence of two witnesses.

SALOMON GROSSMANN.

Witnesses:
 WM. H. LOTZ,
 HARRY COBB KENNEDY.